(12) United States Patent
Lyons

(10) Patent No.: US 7,966,302 B2
(45) Date of Patent: *Jun. 21, 2011

(54) MANAGING LONG-LIVED RESOURCE LOCKS IN A MULTI-SYSTEM MAIL INFRASTRUCTURE

(75) Inventor: Peter K. Lyons, Groton, MA (US)

(73) Assignee: International Business Machines Corporation, Armonk, NY (US)

(*) Notice: Subject to any disclaimer, the term of this patent is extended or adjusted under 35 U.S.C. 154(b) by 0 days.

This patent is subject to a terminal disclaimer.

(21) Appl. No.: 12/842,254

(22) Filed: Jul. 23, 2010

(65) Prior Publication Data

US 2010/0293154 A1 Nov. 18, 2010

Related U.S. Application Data

(62) Division of application No. 11/189,508, filed on Jul. 26, 2005, now Pat. No. 7,769,734.

(60) Provisional application No. 60/591,019, filed on Jul. 26, 2004.

(51) Int. Cl.
*G06F 17/00* (2006.01)

(52) U.S. Cl. .................. 707/704; 709/214; 718/104

(58) Field of Classification Search .................. 707/609, 707/687, 704, 705, 802; 709/214; 718/104
See application file for complete search history.

(56) References Cited

U.S. PATENT DOCUMENTS 6,920,454 B1 * 7/2005 Chan ..................................... 1/1

* cited by examiner

*Primary Examiner* — Fred I Ehichioya
(74) *Attorney, Agent, or Firm* — Steven M. Greenberg, Esq.; Carey, Rodriguez, Greenberg & Paul

(57) ABSTRACT

Embodiments of the present invention address deficiencies of the art in respect to managing resource locks and provide method, system and computer program product for managing long-lived resource locks. In a first embodiment, a data processing system for managing long-lived resource locks can include one or more work items disposed in a database of work items, each of the work items including a lock time and a lock flag. The system also can include one or more worker tasks in a work system enabled to access the work items and to assert locks on the work items. Notably, the system can include a stale lock detection task in an administration system enabled to detect and release stale locks in the work items. Finally, the system can include a lock assertion task in the work system enabled to maintain locks on the work items on behalf of corresponding ones of the worker tasks utilizing the work items.

6 Claims, 2 Drawing Sheets

MANAGING LONG-LIVED RESOURCE LOCKS IN A MULTI-SYSTEM MAIL INFRASTRUCTURE

CROSS-REFERENCE TO RELATED APPLICATIONS

This application is a Divisional of U.S. patent application Ser. No. 11/189,508, filed Jul. 26, 2005, entitled "MANAGING LONG-LIVED RESOURCE LOCKS IN A MULTI-SYSTEM MAIL INFRASTRUCTURE," which is a non-provisional patent application claiming benefit to the now expired U.S. Provisional Patent Application No. 60/591,019, filed Jul. 26, 2004, entitled "MANAGING LONG-LIVED RESOURCE LOCKS IN A MULTI-SYSTEM MAIL INFRASTRUCTURE," the entirety of which are incorporated herein by reference.

BACKGROUND OF THE INVENTION

1. Field of the Invention

The present invention relates to file locking and more particularly to managing long-lived resource locks in a resource locking mechanism.

2. Description of the Related Art

Electronic mail, referred to in the art as e-mail, has proven to be the most widely used computing application globally. Though e-mail has been a commercial staple for several decades, due to the explosive popularity and global connectivity of the Internet, e-mail has become the preferred mode of asynchronous communications, regardless of the geographic separation of communicating parties. Today, more e-mails are processed in a single hour than phone calls. Clearly, e-mail as an asynchronous mode of communications has been postured to replace all other modes of communications excepting voice telephony.

Conventional e-mail processing involves the intermediate and long-term storage of messages in a data store of e-mail messages. For a single user system, managing the data store of e-mail messages can be as simple as managing a series of directory folders in a basic operating system. Larger, distributed corporate e-mail processing differs somewhat from more basic e-mail management systems in that multiple parties can access the functionality and data for the e-mail processing system. Accordingly, in the larger, corporate setting, e-mail messages can be disposed temporarily and permanently in a database management system which can be configured for a high volume transactional environment.

Large corporate e-mail and data processing demands can exceed the capabilities of even the most powerful computing systems. Of paramount importance, access to e-mail resources must be coordinated between different computing devices in order to avoid a race condition for accessing the same resource simultaneously by the different computing devices. Current solutions for coordination access to data between multiple machines include the use of file system file locks or database row locks. When using file system locks or database row locks, once a user access a resource, the resource can be locked from use by other users. Only when the accessing user releases the resource can the other users compete to access the resource.

Thus, using locks, one can achieve a level of synchronization between different computing devices to a shared resource. Notably, if a computing process that has declared ownership of a resource through a lock suddenly becomes nonfunctional, a mechanism is required that can release ownership of the resource from the nonfunctional process so that the resource can be processed by another process. A common solution to an orphaned lock is to utilize a lock time stamp to indicate when ownership over the resource was declared. After a threshold period of time has elapsed, the lock can be released, irrespective of the health of the owning process.

This common approach has a problem in that determining the expiration threshold for how old locks can be before they are considered stale is error prone. If the threshold is too short, the stale lock detection process may clear a resource lock still required by an active process. In contrast, if the threshold is too long, resources that have been abandoned by the process can linger unprocessed for an extended period of time which can introduce substantial latencies in the computing system. In the e-mail context, these inefficiencies can result in the failure to timely deliver a message.

BRIEF SUMMARY OF THE INVENTION

Embodiments of the present invention address deficiencies of the art in respect to managing resource locks and provide a novel and non-obvious method, system and computer program product for managing long-lived resource locks. In a first embodiment, a data processing system for managing long-lived resource locks can include one or more work items disposed in a database of work items, each of the work items including a lock time and a lock flag. The system also can include one or more worker tasks in a work system enabled to access the work items and to assert locks on the work items. Notably, the system can include a stale lock detection task in an administration system enabled to detect and release stale locks in the work items. Finally, the system can include a lock assertion task in the work system enabled to maintain locks on the work items on behalf of corresponding ones of the worker tasks utilizing the work items.

In another embodiment, a method for managing long-lived resource locks can include periodically clearing stale locks for corresponding work items accessed by worker tasks and periodically asserting locks on work items on behalf of accessing worker tasks to avoid a clearing of the asserted locks as stale locks. Periodically clearing stale locks for corresponding work items accessed by worker tasks can include identifying a lock time for each of the corresponding work items, determining whether an elapsed time since the lock time for each of the corresponding work items exceeds a lock expiration time, clearing a lock flag for each of the corresponding work items for which the elapsed time exceeds the lock expiration time, and repeating the identifying, determining and clearing periodically.

Likewise, periodically asserting locks on work items on behalf of accessing worker tasks to avoid a clearing of the asserted locks as stale locks can include querying a registry to identify worker tasks assigned to work items, updating a lock time to a current time for each of the work items which are assigned to the worker tasks, and, repeating the querying and updating periodically. Notably, repeating the identifying, determining and clearing periodically can include repeating the identifying, determining and clearing at an interval which is less than or equal to the lock expiration time. Similarly, repeating the querying and updating periodically can include repeating the querying and updating at an interval which is less than or equal to half said lock expiration time.

Additional aspects of the invention will be set forth in part in the description which follows, and in part will be obvious from the description, or may be learned by practice of the invention. The aspects of the invention will be realized and attained by means of the elements and combinations particularly pointed out in the appended claims. It is to be understood that both the foregoing general description and the following detailed description are exemplary and explanatory only and are not restrictive of the invention, as claimed.

BRIEF DESCRIPTION OF THE SEVERAL VIEWS OF THE DRAWINGS

The accompanying drawings, which are incorporated in and constitute part of this specification, illustrate embodiments of the invention and together with the description, serve to explain the principles of the invention. The embodiments illustrated herein are presently preferred, it being understood, however, that the invention is not limited to the precise arrangements and instrumentalities shown, wherein.

DETAILED DESCRIPTION OF THE INVENTION

Embodiments of the present invention provide a method, system and computer program product for managing long-lived resource locks. In accordance with an embodiment of the present invention, a mechanism can be provided that addresses the problem of setting a short expiration threshold by deploying a separate worker task which can continually update each lock time stamp for corresponding worker tasks that exhaust long periods of time accessing an individual work item before releasing a lock on the work item. In consequence, the worker task can consume a long period of time accessing a work item without requiring a long time-out threshold for all work items. Optionally, the mechanism of the invention can be applied to a multi-system mail infrastructure where multi-system access to mail resources is common.

Figure 1:
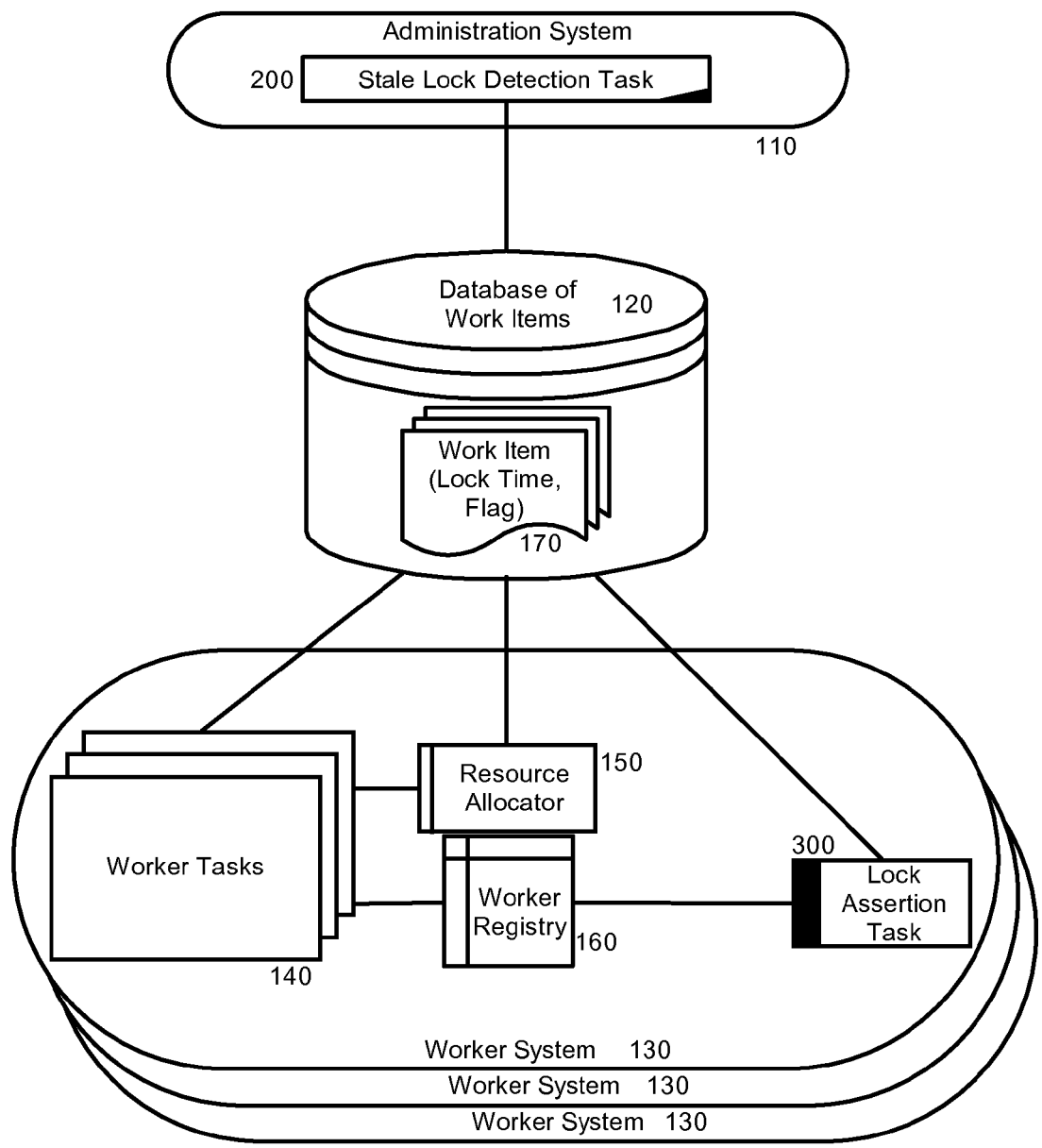
FIG. 1 is a schematic illustration of an administration system configured for managing long-lived resource locks.

In further illustration, FIG. 1 schematically depicts an administration system configured for managing long-lived resource locks. As shown in FIG. 1, one or more worker tasks 140 in a worker system 130 can access work items 170 in a database of work items 120 in order to perform a task. To ensure exclusivity in accessing each work item 170, the worker tasks 140 can assert locks on respective work items 170. The assertion of a lock can be facilitated by work item allocation logic 150 and the lock can be maintained by the lock assertion task 300. Finally, stale locks can be detected and cleared by a stale lock detection task 110 which can be disposed in an administration system 110.

The following table illustrates the components shown in FIG. 1.

| Term | Description |
| --- | --- |
| Work Item | A "Work Item" is a data that describes a piece of work. In this invention a "Work Item" is considered to always contain at least two pieces of data, a "Lock Flag" indicates whether the "Work Item" is owned or not owned and a "Lock Time t" records the time when the "Work Item" became owned. |
| Lock Expiration Threshold | The "Lock Expiration Threshold" is the time interval that a lock may be in place before he "Stale Lock Detection Task" will automatically release the lock. |
| Stale Lock Detection Task | The "Stale Lock Detection Task" is an agent that examines the set of work item looking for individual "Work Items" that have had their "Lock Time Stamp" exceeded the "Lock Expiration Threshold." |
| Administrative System | An "Administrative System" is a computer system running administrative tasks such as the "Stale Lock Detection Task." |
| Database of Work Items | The "Database of Work Items" is shared repository of "Work Items." The "Database of Work Items" is shared between the "Administrative System" and the collection of all "Worker Systems." |
| Work System | A "Worker System" is a computer system running "Worker Tasks." |
| Worker Task | A "Worker Task" is a single thread of execution that owns a single "Work Item" to process. |
| Work Allocator | The "Work Allocator" coordinates allocation of "Work Items" to "Worker Tasks" across multiple "Worker Systems." Work Allocators" running on each "Worker System" must coordinate to keep from allocating the same "Work Item" to more than one "Worker Task." |
| Worker Registry | A "Worker Registry" keeps track of what "Work Items" are being processed by which "Worker Tasks" on a specific "Work System." |
| Lock Assertion Task | The "Lock Assertion Task" uses to "Worker Registry" to determine which "Worker Tasks" of the current "Work System" are associated with "Work Items" and periodically updates all associated "Work Items" "Lock Time Stamp" at an interval less than the "Lock Expiration Threshold." |

In operation, when access to a work item 170 is required, the a worker task 140 can request access to the worker item 170 through work item allocation logic and the worker task 140 can set the flag in the work item 170 and can write an entry to the worker registry 160 associating the worker task 140 with the requested work item 170. When the worker task 140 completes accessing the work item 170, the worker task can clear the lock flag in the work item 170 and the entry in the worker registry 160. Throughout the course of operation of the worker tasks 140, however, the stale lock detection task 200 can identify stale locks among the work items 170 and can clear those locks.

Consequently, to avoid the inadvertent clearance of a lock, once the work item 170 has been allocated to the work task 140, lock assertion task 300 can maintain the lock by avoiding staleness by updating the lock time associated with the work item 170. In this way, as the stale lock detection task 200 detects stale locks by comparing the lock time for a work item with a current time, a threshold of time will not have passed between the updated time and the current time so as to cause a lock on the work item to be deemed stale.

Figure 2:
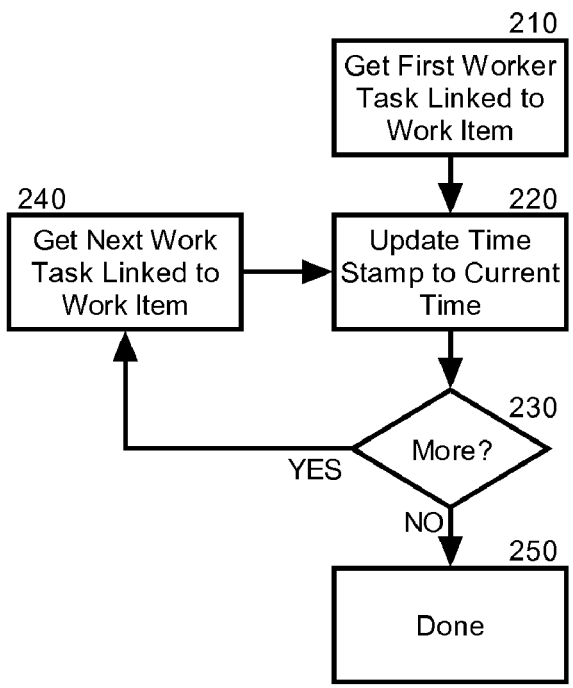
FIG. 2 is a flow chart illustrating a process for asserting a lock in the system of FIG. 1; and, FIG. 3 is a flow chart illustrating a process for detecting a stale lock in the system of FIG. 1.

In more particular illustration, FIG. 2 is a flow chart illustrating a process for asserting a lock in the system of FIG. 1. Beginning in block 210, the first worker task linked to a work item can be retrieved from the registry. In block 220, the lock time for the work item can be updated with a current time. Subsequently, in block 230 if more worker tasks remain to be processed in the registry, in block 240 a next worker task linked to a work item can be retrieved for processing. When no more worker tasks remain to be processed, the process can end in block 250. Notably, the process of FIG. 2 can repeat periodically—preferably before half of the lock expiration time used by the stale lock detection task to identify a stale lock.

Figure 3:
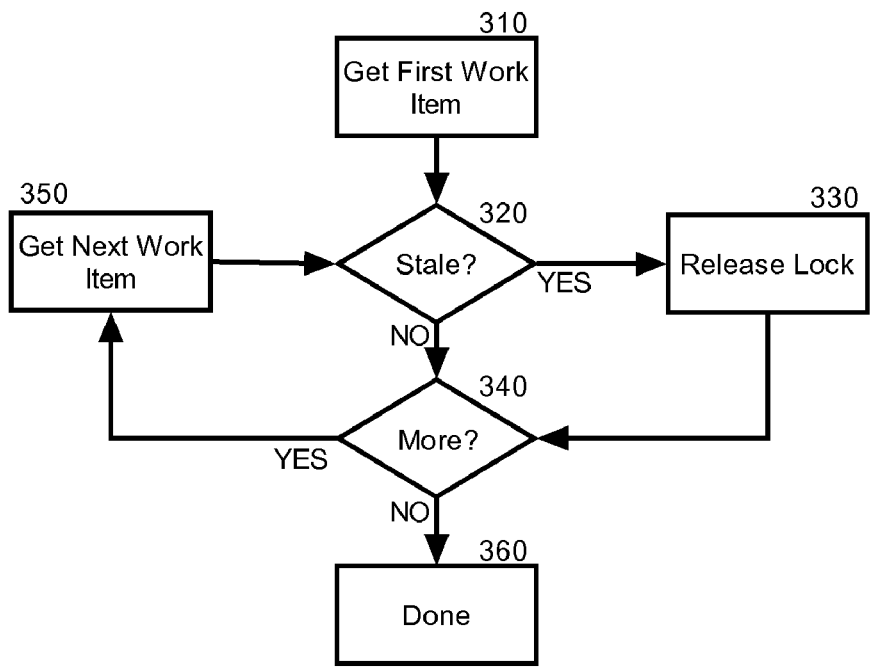

Turning now to FIG. 3, a flow chart is shown which illustrates a process for detecting a stale lock in the system of FIG. 1. Beginning in block 310, a first work item in a database of work items can be retrieved for inspection. In decision block 320, the work item can be inspected to determine if a lock has been applied and whether the lock had been applied for a period of time which exceeds a threshold value referred to as a lock expiration time. If so, in block 330 it can be determined that the lock is stale and the lock can be released in block 330. In either case, if more work items remain to be processed, the next work item in the database can be retrieved for processing and the process can repeat in decision block 320. When no further work items remain to be processed, the process can end in block 360. Notably, the process of FIG. 3 can repeat periodically—preferably before the expiration of the lock expiration time used by the stale lock detection task to identify a stale lock.

Embodiments of the invention can take the form of an entirely hardware embodiment, an entirely software embodiment or an embodiment containing both hardware and software elements. In a preferred embodiment, the invention is implemented in software, which includes but is not limited to firmware, resident software, microcode, and the like. Furthermore, the invention can take the form of a computer program product accessible from a computer-usable or computer-readable medium providing program code for use by or in connection with a computer or any instruction execution system.

For the purposes of this description, a computer-usable or computer readable medium can be any apparatus that can contain, store, communicate, or transport the program for use by or in connection with the instruction execution system, apparatus, or device. The medium can be an electronic, magnetic, optical, electromagnetic, infrared, or semiconductor system (or apparatus or device). Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution. Input/output or I/O devices (including but not limited to keyboards, displays, pointing devices, etc.) can be coupled to the system either directly or through intervening I/O controllers. Network adapters may also be coupled to the system to enable the data processing system to become coupled to other data processing systems or remote printers or storage devices through intervening private or public networks. Modems, cable modem and Ethernet cards are just a few of the currently available types of network adapters.

I claim:

1. A data processing system for managing long-lived resource locks comprising:
    a computer with processor and memory;
    a plurality of work items disposed in a database of work items in the memory, each of said work items comprising a lock time and a lock flag;
    a plurality of worker tasks in a work system in the computer, the plurality of worker tasks being enabled to access said work items and to assert locks on said work items;
    a stale lock detection task in an administration system in the computer, the stale lock detection task being enabled to detect and release stale locks in said work items; and,
    a lock assertion task in said work system enabled to maintain locks on said work items on behalf of corresponding ones of said worker tasks utilizing said work items;
    wherein the stale locks are periodically cleared for corresponding work items accessed by the worker tasks; and,
    wherein the locks are periodically asserted on the work items on behalf of the accessing worker tasks to avoid a clearing of said asserted locks as stale locks.

2. The data processing system of claim 1, wherein said worker system is part of a multi-system mail infrastructure.

3. The data processing system of claim 1, further comprising work item allocation logic disposed in said worker system, said work item allocation logic comprising program code enabled to allocate requested ones of said work items to requesting ones of said worker tasks.

4. The data processing system of claim 1, further comprising a worker registry disposed in said worker system, said worker registry recording worker items accessing corresponding ones of said work items, said lock assertion task using said worker registry to identify work items to be periodically updated with a current time for a lock time.

5. The data processing system of claim 1, wherein said stale lock detection task is configured to execute periodically at an interval equal to or less than a lock expiration time utilized by said stale lock detection task to identify stale locks among said work items.

6. The data processing system of claim 5, wherein said lock assertion task is configured to execute periodically at an interval which is equal to or less than half that of the said lock expiration time.

* * * * *